(12) United States Patent
O'Shaugnessy et al.

(10) Patent No.: US 8,392,847 B2
(45) Date of Patent: Mar. 5, 2013

(54) SYSTEM AND METHOD FOR PROVIDING CONTENT ON AN ELECTRONIC DEVICE

(75) Inventors: Kevin M. O'Shaugnessy, Galway (IE); Michael K. Akamine, Milipitas, CA (US); Dianne P. Dominguez, Beverly Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 12/123,914

(22) Filed: May 20, 2008

(65) Prior Publication Data

US 2009/0293013 A1 Nov. 26, 2009

(51) Int. Cl.
*G06F 3/048* (2006.01)
(52) U.S. Cl. .......................... 715/785; 715/810; 715/863
(58) Field of Classification Search .................. 715/863, 715/810, 785
See application file for complete search history.

(56) References Cited

U.S. PATENT DOCUMENTS

| 7,343,564 | B2 | 3/2008 | Othmer | |
|---|---|---|---|---|
| 2008/0168478 | A1* | 7/2008 | Platzer et al. | 719/328 |
| 2008/0263452 | A1* | 10/2008 | Tomkins | 715/730 |
| 2009/0063974 | A1* | 3/2009 | Bull et al. | 715/716 |
| 2009/0144661 | A1* | 6/2009 | Nakajima et al. | 715/835 |
| 2009/0172532 | A1* | 7/2009 | Chaudhri | 715/702 |
| 2009/0178008 | A1* | 7/2009 | Herz et al. | 715/840 |

OTHER PUBLICATIONS

Helio Is Here, Innovative 3G Services, Exclusive Devices and Personalized Service & Support; printed from http://www.helio.com/about/media-center/press-release-detail?contentid=1146535515494; dated Oct. 22, 208; 6 pages.

* cited by examiner

*Primary Examiner* — Andrea Leggett

(57) ABSTRACT

A computing device includes a display and a processor coupled to the display and configured to display a plurality of items of information in a time-sequential manner, with a predetermined time interval between items of information being displayed. At least one of the items of information includes data originating from an application operating on the computing device.

23 Claims, 3 Drawing Sheets

SYSTEM AND METHOD FOR PROVIDING CONTENT ON AN ELECTRONIC DEVICE

BACKGROUND

The present application relates generally to electronic devices, and more particularly, to systems and methods for providing content or data to users of electronic devices in a way that provides an intuitive interface for users to view and/or access the content or data.

Conventional electronic devices may provide a variety of information to users in the form of, for example, status indicators (e.g., icons) provided on a "home-page" screen. Often these home-page screens become cluttered as the amount of information, and the number of status indicators provided, increases, potentially confusing users of the devices.

Accordingly, the embodiments herein may provide an improved system and method for providing content, or data, to users of electronic devices.

DETAILED DESCRIPTION

Figure 3:
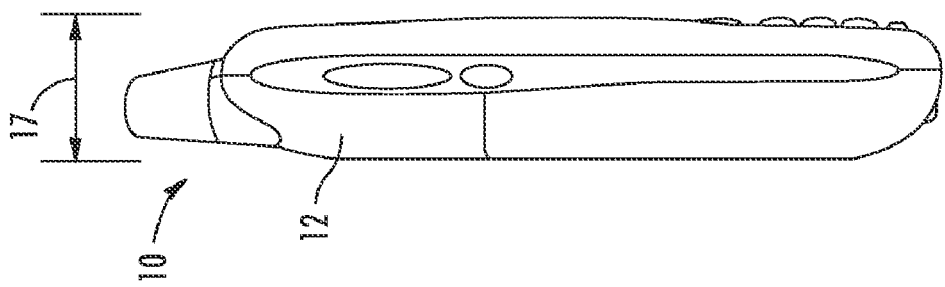
FIG. 3 is a side view of the mobile computing device of FIG. 1 according to an exemplary embodiment.
Figure 2:
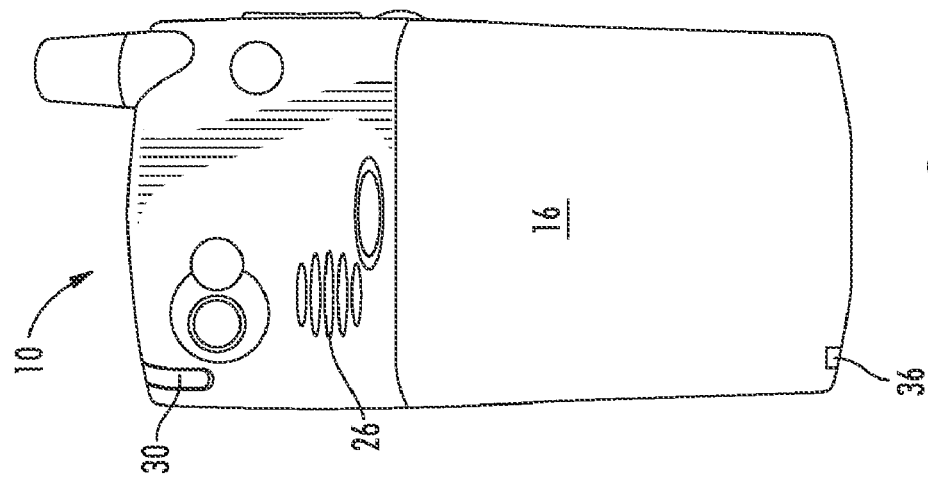
FIG. 2 is a back view of the mobile computing device of FIG. 1 according to an exemplary embodiment.
Figure 1:
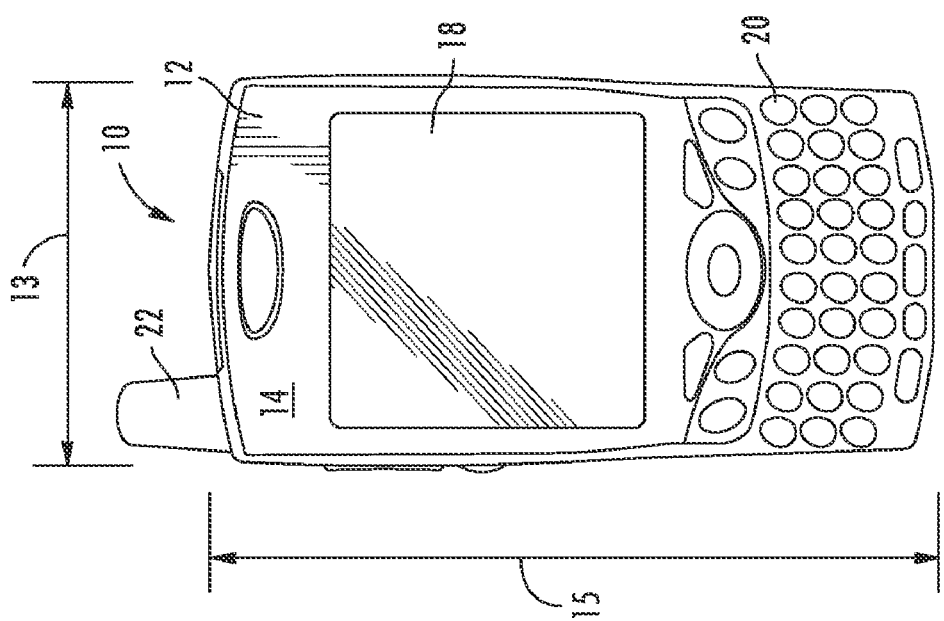
FIG. 1 is a front view of a mobile computing device according to an exemplary embodiment.

Referring to FIGS. 1-3, a mobile computing device 10 is shown. The teachings herein can be applied to device 10 or to other electronic devices (e.g., a desktop computer), mobile computing devices (e.g., a laptop computer), or handheld computing devices, such as a personal digital assistant (PDA), smartphone, mobile telephone, personal navigation device, etc. According to one embodiment, device 10 is a smartphone, which is a combination mobile telephone and handheld computer having PDA functionality. PDA functionality can comprise one or more of personal information management (e.g., including personal data applications such as email, calendar, phone, text messaging, etc.), database functions, word processing, spreadsheets, voice memo recording, Global Positioning System (GPS) functionality, etc. Device 10 is configured to synchronize personal information from these applications with a computer (e.g., a desktop, laptop, server, etc.). Device 10 is further configured to receive and operate additional applications provided to device 10 after manufacture, e.g., via wired or wireless download, SecureDigital card, etc.

As shown in FIGS. 1-3, device 10 includes a housing 12 and a front side 14 and a back side 16. Device 10 further comprises a display 18 and a user input device 20 (e.g., a QWERTY keyboard, buttons, touch screen, speech recognition engine, etc.). Display 18 can comprise a touch screen display in order to provide user input to a processor 40 (see FIG. 4) to control functions, such as to select options displayed on display 18, enter text input to device 10, or enter other types of input. Display 18 also provides images (see, e.g., FIG. 5) that are displayed and may be viewed by users of device 10. User input device 20 can provide similar inputs as those of touch screen display 18. Device 10 can further comprise a speaker 26, and a stylus 30 to assist the user in making selections on display 18.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment. Device 10 may be a hand-held computer, which is a computer small enough to be carried in a user's hand while in use, which would include typical mobile telephones and personal digital assistants, but exclude typical laptop computers. While described with regard to a hand-held device, many embodiments are useable with portable devices which are not handheld and/or not portable devices/systems.

In various embodiments, housing 12 could be any size, shape, and dimension. In some embodiments, housing 12 has a width 13 (shorter dimension) of no more than about 200 mm or, alternatively, no more than about 100 mm. According to some embodiments, housing 12 has a width 13 of at least about 30 mm or, alternatively, at least about 50 mm. In some embodiments, housing 12 has a length 15 of no more than about 200 mm or, alternatively, no more than about 150 mm. According to some of these embodiments, housing 12 has a length 15 (longer dimension) of no more than about 200 mm or, alternatively, no more than about 150 mm. According to some embodiments, housing 12 has a length 15 of at least about 70 mm or, alternatively, at least about 100 mm. In some embodiments, housing 12 has a thickness 17 (smallest dimension) of no more than about 150 mm or, alternatively, no more than about 50 mm. According to some of these embodiments, housing 12 has a thickness 17 of no more than about 50 mm or, alternatively, no more than about 25 mm. According to some embodiments, housing 12 has a thickness 17 of at least about 10 mm or, alternatively, at least about 15 mm. In some embodiments, housing 12 has a volume of up to about 2500 cubic centimeters or, alternatively, up to about 1500 cubic centimeters.

Figure 4:
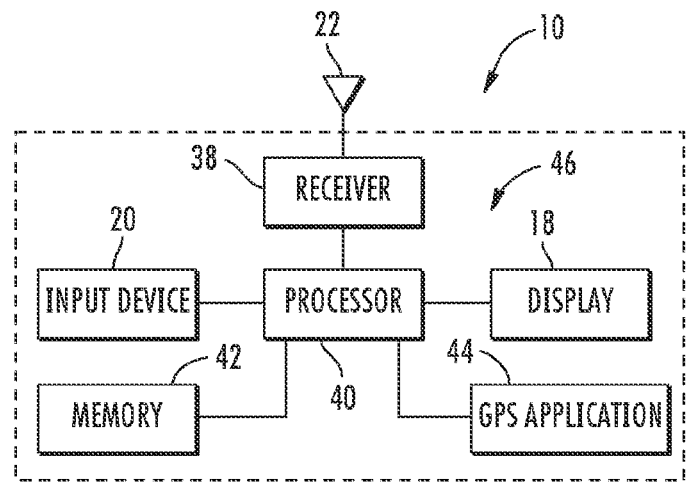
FIG. 4 is a block diagram of the mobile computing device of FIG. 1 according to an exemplary embodiment.

Referring now to FIG. 4, device 10 comprises a processing circuit 46 comprising a processor 40. Processor 40 can comprise one or more microprocessors, microcontrollers, and other analog and/or digital circuit components configured to perform the functions described herein. Processor 40 comprises or is coupled to one or more memories such as memory 42 (e.g., random access memory, read only memory, flash, etc.) configured to store software applications provided during manufacture or subsequent to manufacture by the user or by a distributor of device 10. In one embodiment, processor 40 can comprise a first applications microprocessor configured to run a variety of personal information management applications, such as email, a calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a receiver 38 which comprises analog and/or digital electrical components configured to receive and transmit wireless signals via antenna 22 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 36 (see FIG. 2) configured to receive audio signals, such as voice signals, from a user or other person in the vicinity of device 10, typically by way of spoken words. Alternatively or in addition, processor 40 can further be configured to provide video conferencing capabilities by displaying on display 18 video from a remote participant to a video conference, by providing a video camera on device 10 for providing images to the remote participant, by providing text messaging, two-way audio streaming in full- and/or half-duplex mode, etc.

Device 10 further comprises a location determining application, shown in FIG. 3 as GPS application 44. GPS application 44 can communicate with and provide the location of device 10 at any given time. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more location determination modes including, for example, a standalone mode, a mobile station (MS) assisted mode, and/or an MS-based mode. In a standalone mode, such as a standalone GPS mode, device 10 may be arranged to autonomously determine its location without real-time network interaction or support. When operating in an MS-assisted mode or an MS-based mode, however, device 10 may be arranged to communicate over a radio access network (e.g., UMTS radio access network) with a location determination entity such as a location proxy server (LPS) and/or a mobile positioning center (MPC).

Figure 5:
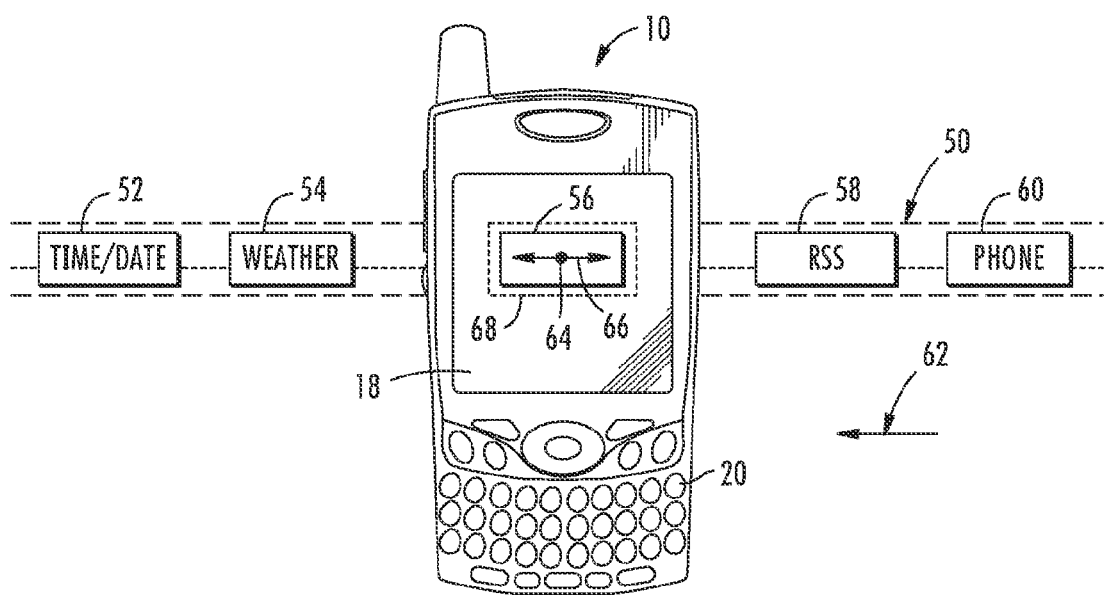
FIG. 5 is a front view of the mobile computing device of FIG. 1 according to an exemplary embodiment.

Referring now to FIG. 5, device 10 is shown according to an exemplary embodiment. As shown in FIG. 5, device 10 may be configured to provide a data feed 50 (e.g., a ticker, scroller, stream, feed, etc.) that includes a plurality of images 52-60 (e.g., message items, items of information, etc.) on display 18. For example, images 52-60 may be items of information or message items that relate to a messaging application (e.g., email, voicemail, SMS, MMS, etc.) or may be items of information or message items that convey a "message" to a user (e.g., news, weather, stock quotes, etc.). According to various exemplary embodiments, images 52-60 may include text, graphics, hypertext links, etc., or any combination thereof, or any of a wide variety of other types or items of information or data that may be presented to users. In some embodiments, images 52-60 are provided on display 18 in a time-sequential manner. For example, according to one embodiment, images 52-60 are provided in a manner so as to appear to scroll across display 18 in the direction of arrow 62 (e.g., similar to a stock ticker) such that each image occupies the same general area or space 68 on display 18 in sequential periods of time. Images 52-60 may scroll across display 18 at a generally continuous rate of speed, or alternatively, each image may be temporarily paused while it occupies area 68. According to an alternative embodiment, rather than scrolling across display 18, images 52-60 may be displayed in a sequential manner such that there is no appearance of scrolling. It should be understood that the various methods of providing images 52-60 in a time-sequential manner described herein are provided for purposes of illustration only, and other such methods may be used. All such methods are within the scope of the present disclosure.

According to an exemplary embodiment, a user may provide inputs to device 10 to control (modify, adjust, etc.) the direction (e.g., the order of presentation, direction of scroll, etc.) or speed (e.g., the speed of the scrolling, the time interval between subsequent images, etc.) of the presentation of images 52-60. For example, as shown in FIG. 5, images 52-60 may be presented in a scrolling manner in the direction of arrow 62. If a user does not engage device 10 (e.g., provide some sort of input), the images will continue to scroll across display 18 in a scrolling manner, providing a default state or mode of operation for data feed 50. In order to reverse the direction of the scrolling, a user may provide an input to (e.g., engage) device 10, for example, via display 18 (e.g., a touch screen display). A user may touch display 18, for example, with a fingertip at location 64, and then move (swipe, gesture, etc.) the fingertip in the direction of arrow 66. Processor 40 may then reverse the direction of the scrolling of data feed 50 from the direction of arrow 62 to the direction of arrow 66 (e.g., from right-to-left to left-to-right as shown in FIG. 5). Successive swipes or gestures provided on display 18 permit the user to continue to scroll through images in either direction. This provides the user with the ability to browse back and forth through the images of data feed 50 as one might turn back and forth through the pages of a traditional book or magazine. It should be understood that in some embodiments, images 52-60 are "animated" so as to appear to slide across display 18 such that it may be intuitive to a user (in particular, an uniformed/untrained user of device 10) that the user may "engage" the data feed by "sliding" the images and effectively mimicking the animation of the images.

Processor 40 may also adjust the speed of the scrolling according to the speed of the user's gesture. For example, processor 40 may control the scrolling of images 52-60 across display 18 such that a relatively faster gesture increases the rate at which images 52-60 scroll across display 18, and a relatively slower gesture decreases the rate at which images 52-60 scroll across display 18.

According to various other exemplary embodiments, the user may control the speed and/or direction of data feed 50 in different ways. For example, should a user contact an image on display 18, the image may be paused on display 18 for a predetermined amount of time (e.g., 2 seconds, 3 seconds, etc.) before the scrolling recommences (e.g., as part of a default state). Further, a user may control only the scrolling speed by gesturing in the same direction as the scrolling, such that the direction of the scrolling is not changed (e.g., by swiping a finger across display 18 in the same direction of arrow 62 as images 52-60 scroll across display 18 in the direction of arrow 62).

According to an exemplary embodiment, processor 40 returns data feed 50 to a default state (e.g., images scrolling across display 18 at a predetermined speed and in a predetermined direction) should a user not engage device 10 for a predetermined amount of time (e.g., 2 seconds, 3 seconds, etc.). Furthermore, data feed 50 may provide all or part of a screensaver for device 10. Further yet, while FIG. 5 shows a default state for data feed 50 having a right to left scroll or display order, other ways of displaying images 52-60 in the default or other state may be used (e.g., left to right, up/down, etc.). According to an exemplary embodiment, adjustments to the speed and/or direction of data feed 50 are temporary, such that, for example, should a user change the direction or speed of data feed 50, processor 40 will temporarily present images 52-60 at the adjusted speed/direction, and then return data feed 50 to the default state.

While as discussed herein a user may control the presentation of images 52-60 via display 18, according to various exemplary embodiments, other forms of input and input devices may be used to provide such control. For example, device 10 may be provided with buttons or keys that have predetermined input functions (e.g., left, right, increase speed, decrease speed, select image, etc.). Alternatively, device 10 may be configured to receive voice commands from a user. Other means of providing the necessary inputs to device 10 may be used according to various alternative embodiments, and all such means are within the scope of the present disclosure.

In some embodiments, image 56 may represent, describe, or otherwise be associated with a wide variety of data (e.g., content, information, etc.). For example, referring again to FIG. 5, image 56 may indicate the current time and date (image 52), include weather data, such as temperature, forecast data, etc. for a specific location (image 54), provide an RSS feed (image 58), or provide an indication that a user has a new voicemail, email message, or other message (e.g., SMS, MMS, etc.) (image 60). According to various alternative embodiments, images 52-60 may include or be associated with more or less data or content than that shown in FIG. 5. For example, stock information may be provided for one or more companies such that the ticker symbols and current stock prices or other relevant information (up/down indicators, last close value, trading volume, etc.) for one or more companies is provided.

Furthermore, calendar and/or appointment data may be provided, such as an indication of a user's next appointment (e.g., within a predetermined amount of time such as the next day, the next 8 hours, etc.), a user's next available time slot (e.g., within a predetermined amount of time such as the next day, the next 8 hours, during working hours, etc., and/or for a minimum amount of time, such as a 30 minute time period, a 1 hour time period, etc.). Further yet, multi-media data may be provided to a user, such as "now playing" data for music including an album, artist, and/or song title, or the source of music should a streaming audio source be used. Artwork (if available), associated with the music may further be displayed.

In some embodiments, data feed 50 may be configured to receive and display notifications that device 10 is in proximity to a data or content source (e.g., a remote source such as one of remote sources 80-84, which may be a music library shared over a WiFi or other network, etc.). For example, should a user be at a location with a wirelessly accessible media library, a notification may be provided indicating that the media library is available. The user may then connect to the media library by engaging (e.g., selecting) the notification from data feed 50. This type of user interface and engagement features may be applied to a wide variety of data or content sources, and may be used to provide various types of notifications, status updates, etc., via data feed 50. All such applications are deemed to be within the scope of the present application.

According to various other exemplary embodiments, other types of data and/or information may be provided to users via images 52-60, such as on-line advertisements (e.g., based upon the location of a user and user likes/dislikes determined by a user profile and/or user personal information management data), search queries, battery status, alarm time, contact entries (e.g., a scrolling photograph of a person for which contact data is available such that a phone call/email may be initiated by simply selecting the image with the photograph), and so on. For example, should a user attempt to place a phone call and receive a busy signal, the user may wish to receive a notification when the "presence" of the other user changes from, for example, "busy" to "available." Data feed 50 may be configured such that a notification of the change in presence of the other user is provided as a part of data stream 50.

Figure 7:
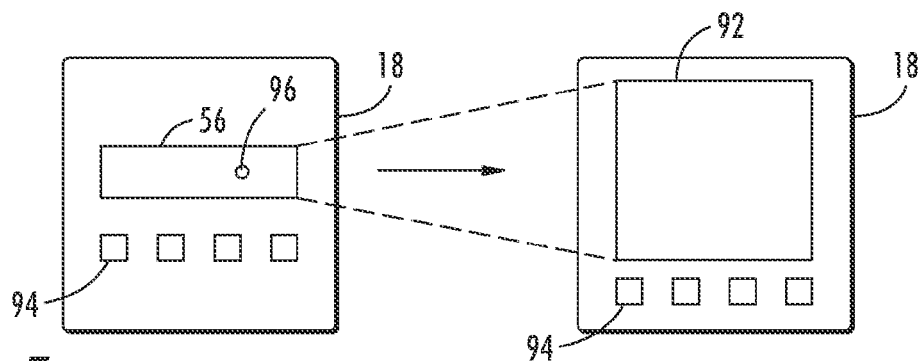
FIG. 7 is an illustration of a display for a mobile computing device according to an exemplary embodiment.

Referring to FIG. 7, as the various images are provided on display 18, a user may wish to view additional data associated with the image (e.g., a user viewing an image indicating that a new email message has arrived may wish to view the actual email). According to an exemplary embodiment, one or more images (e.g., image 56 shown in FIG. 7) are or include selectable links (e.g., link 96 shown in FIG. 7) to further data and/or content such that a user may "select" (e.g., tap on with a finger, press a button with a pre-set function, and so on) an image such as image 56 or a link embedded therein and be provided with additional data or content associated with the image, shown in FIG. 7 as image 92. For example, a user viewing an image related to an RSS story may be provided with a preview of an article, or the complete article, as part of image 92, should the user select image 56. Similarly, a user that selects an image such as image 56 indicating that a new email or other message has arrived may be provided with the complete email message as a part of image 92. Other types of additional data or content may be provided to users based on the image selected (e.g., media player information, calendar information, additional weather information, etc.). The additional content may be provided by a local source (e.g., an on-device email application) or a remote source (e.g., a network-based RSS feed).

According to an exemplary embodiment, upon a user engaging data feed 50 (e.g., selecting one of images 52-60), the selected image may expand to fill a greater portion of, or all of, display 18. For example, as shown in FIG. 7, upon image 56 being selected by a user, image 56 may be enlarged to image 92, which may display different content from image 56. In some embodiments, the transition from image 56 to image 92 may be a fluid expansion of the image, such that a user is provided with an intuitive sense of the relation between the images. This avoids sudden "jumping" between displayed images and potential user confusion.

Figure 6:
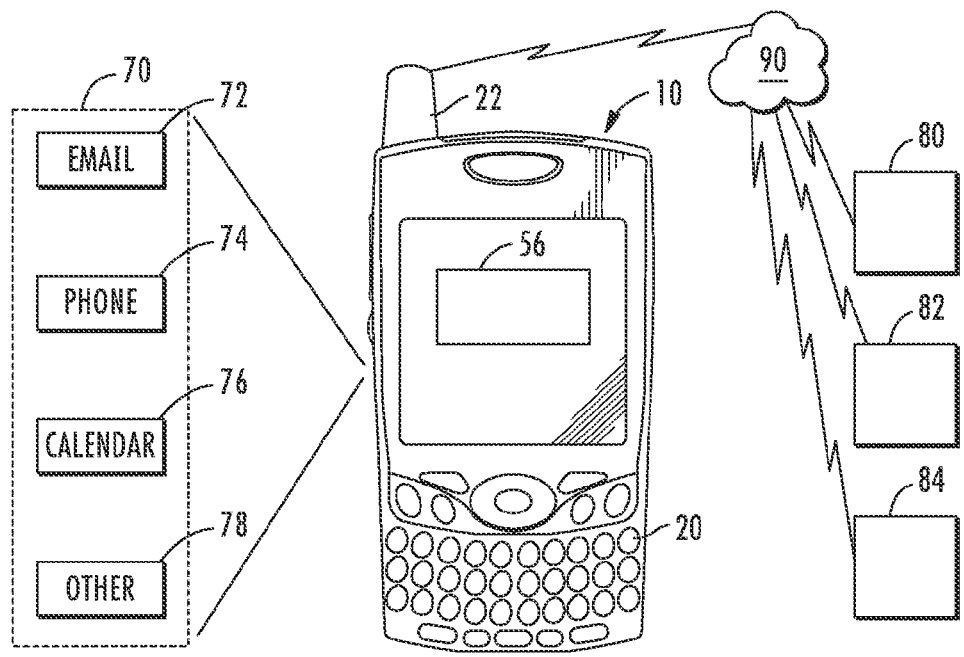
FIG. 6 is an illustration of a mobile computing device and various data or content sources according to an exemplary embodiment.

Referring to FIG. 6, according to an exemplary embodiment, the data provided via images 52-60, and any additional data provided on images such as image 92, may include data from both remote (e.g., network-based) sources and local (e.g., on-device) sources. For example, as shown in FIG. 6, device 10 may provide images that display data or content that is associated with on-device sources 70 such as an email application 72, a phone application 74, a calendar application 76, or other on-device sources 78 (e.g., contacts, SMS, etc.).

At the same time, device 10 may also provide images that display data or content that is received from a remote source via a communication link (e.g., wired, wireless, infrared, Bluetooth, etc.). For example, device 10 may communicate wirelessly over a wireless network such as network 90 (e.g., the Internet) with remote data sources 80, 82, and 84. According to an exemplary embodiment, sources 80-84 may provide weather data, stock data, RSS feeds, general news, etc., or other data or content.

It should be noted that the ability of device 10 to provide images having data provided by both remote and local sources provides many advantages over more conventional "media tickers," where normally only network-based data (e.g., RSS feeds, etc.) is provided. For example, images 52-60 provide users with the ability to view data and status information not generally available to third parties (e.g., email data, calendar data, etc.). According to various exemplary embodiments, data feed 50 may be configured to include data from only on-device sources, only remote sources, or a combination thereof. Utilizing on-device data also permits the data to be filtered on a more user-specific basis when compared to data received from remote sources such as RSS feeds, weather data, etc. According to various exemplary embodiments, data or content from a local or on-device source may include, for example, data that "originates" from an application running on device 10 (e.g., data from a personal information management application, etc.), data that is indicative of a state of an application running on device 10 (e.g., a music player, etc.), data that is generated by an application running on device 10 (e.g., a status indicator, etc.), and so on.

According to an exemplary embodiment, data feed 50 may be configured (e.g., customized by a user, etc.) to provide multiple images from a single data source. For example, data feed 50 may be configured to include images associated with multiple emails (e.g., the three most recent, etc.) from a data source such as a folder (e.g., an Inbox folder, etc.) multiple news stories (e.g., two, three, four, etc.) from a data source, and so on. The number of images provided from each data source may be varied between data sources and may be configurable by a user.

Furthermore, the images associated with each data source may be updated periodically to ensure that the most relevant (e.g., most recent, most important to a user, etc.) images are provided as part of data feed 50. Conceptually, in some embodiments the display data for the images may form a "conceptual stack of images" which may be stored in a separate cache or memory, in which images or items of information are pulled one after another from the top of the stack for display, then returned to the bottom of the stack. New items may arrive at the "top" of the stack (or the bottom of the stack, or in the middle according to a predetermined ranking based on the type of data), and data feed 50 may be updated with the most recent and/or relevant arrivals. For example, according to various exemplary embodiments, images may be "pulled" from the stack for display in a time-based manner (e.g., first-in, first-out; last-in, first-out; etc.), according to user preferences (e.g., in accordance with a user profile, user rankings of data sources, user favorites, etc.), according to user activity (e.g., web sites recently visited, locations of the user, etc.), and so on, or any combination thereof. In one embodiment, an item of information may have a maximum number of times it will be displayed, which number may be predetermined by the user, the data source, or manufacturer of the device. The maximum number of times may be the number of times the data is displayed before moving on to display data of a same or similar type (e.g., a news story). In another embodiment, an item of information may be displayed more often or more frequently at a time it is received from the data source, and then displayed less frequently over time until it eventually stops being displayed.

According to an exemplary embodiment, a user may customize data feed 50 and the delivery of image 52-60. For example, a user may define the placement and/or size of the images on display 18, along with the speed and/or direction of the scrolling of the images in the default mode of data feed 50. A user may also define what data is displayed on the images (e.g., a user may be provided with a predetermined list of data types (e.g., weather, email, date/time, etc.) and/or "favorites" (e.g., applications, websites, speed-dial contacts, etc.), and the user may select which data types are to be provided as part of the scrolling display of images). According to various alternative embodiments, the level of detail to which a user may configure the display of images may be varied. For example, to provide detailed customization, users may be able to tailor what weather information is displayed (e.g., temperature, rainy/sunny, etc.), what stock tickers to present, for which contacts email, voicemail, or other message notifications are to be presented, which sources for news and/or RSS feeds are to be used, and so on.

Referring to FIG. 7, in some embodiments, a user may configure data feed 50 by "dragging" (e.g., selecting and moving across display 18) an icon or object 94 (e.g., an icon, data field, etc.) onto data feed 50 (e.g., image 56), such that processor 40 will update data feed 50 to include data associated with the newly selected object. For example, a user may wish to receive an RSS feed associated with a specific web page. The user may drag an icon such as icon 94 associated with the web page onto the scrolling images of data feed 50, and the RSS feed (or data associated with the RSS feed) provided on the web page may be incorporated into data feed 50. Other ways of updating or configuring data feed 50 may be used according to various other exemplary embodiments.

Figure 8:
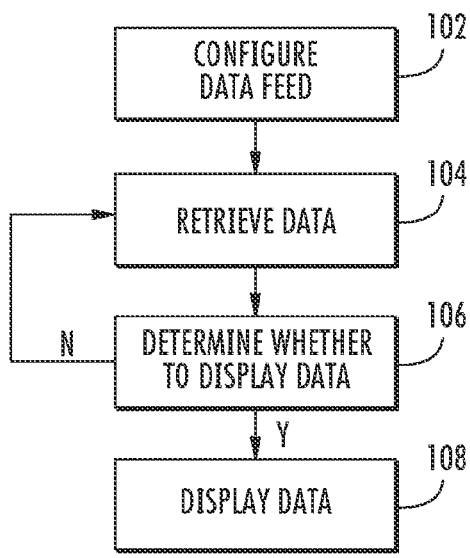
FIG. 8 is a flow chart illustrating a method for providing content to a mobile computing device according to an exemplary embodiment.

Referring now to FIG. 8, a method for providing content to a user via a data feed such as data feed 50 is illustrated according to an exemplary embodiment. First, a user may configure data feed 50 as discussed above (e.g., select the data types, the presentation format, etc.) (step 102). Next, processor 40 retrieves the data to be displayed on images 52-60 (step 104). According to one embodiment, the data to be displayed is stored in a separate cache provided by memory 42 such that delays associated with processing images 52-60 are minimized. The cached data can then be updated, either continuously or periodically (e.g., every 2, 5, 10 minutes, etc.), to update the data provided by data feed 50. Furthermore, the cached data may be updated automatically after a user engages data feed 50.

Next, processor 40 reviews the data to be displayed (step 106). According to one embodiment, the review of the data includes a determination of whether to display an image associated with particular data. Processor 40 may determine whether to display the data based upon the relevancy to the user or whether there is any "new" data to present (e.g., new emails, voicemails, etc.). For example, processor 40 may selectively display images 52-60 such that users are not provided with less-meaningful data, such as an image that includes a notification of "No new emails," or "No new voicemails," etc. Providing a more intelligent and selective system for displaying images 52-60 via data feed 50 may eliminate or reduce unneeded clutter on display 18 and prevent data feed 50 from becoming too large or unmanageable in size. According to an exemplary embodiment, the number of images provided as a part of data feed 50 may be limited to a predetermined number (e.g., 8, 10, etc.) and processor 40 may choose the most relevant images to display based on the data associated with the image (e.g., an image indicating an urgent email has been received may be displayed rather than an image indicating what song/artist the user is listening to).

If, at step 106, processor 40 determines that the data should be displayed, the appropriate image is provided as a part of data feed 50 (step 108). If, however, processor 40 determines that the data should not be displayed, an image is not provided for the specific data, and processor 40 proceeds to retrieve the data for the next image to potentially be displayed (step 104). It should be noted that should the data to be displayed in data feed 50 be stored in a cache such as memory 42 so that the display data (e.g., the "stack" of images, etc.) is simply retrieved and displayed, the data in the cache only needs to be reviewed by processor 40 once between updates of the cache to determine whether to display the data. The data may then be included in data feed 50 until the next update of the cache, when the data will again be reviewed by processor 40. It should be noted that caching the display data also avoids the need for processor 40 to retrieve display data from various databases as the images of data feed 50 are generated.

It should be understood that data feed 50 may be configured in a variety of ways. For example, in some embodiments, the type of data provided in data feed 50 may be based in part on the usage of device 10. For example, if device 10 is used more (e.g., powered on) in the morning, data feed 50 may be configured to provide more news-related data (e.g., more images) and/or update news-related data more frequently during the morning relative to other times of day.

Furthermore, data feed 50 may be configured so that the images are provided in a valuable, time-sensitive manner to users (e.g., the images or data are provided when they are most valuable to a user). For example, with respect to a user who has been attempting to contact another user but has only received "busy" signals, a notification of the change in "presence" of the other user is most valuable, and would therefore be presented more frequently, immediately after the notification was received, and would be shown less frequently as time passed until, after a certain period (e.g., 5 minutes, etc.), the notification was no longer displayed. Device 10 and/or data feed 50 may be configured in a variety of other ways according to various other embodiments.

While the detailed drawings, specific examples, and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A computing device, comprising:
   a display; and
   a processor coupled with the display and to automatically display a plurality of items of information in a time-sequential manner on the display, with a predetermined time interval between items of information being displayed such that the plurality of items of information automatically scroll across the display at a default rate and without user interaction, the processor to adjust at least one of the time interval between items of information being displayed and a direction in which the items of information are scrolled across the display; the plurality of items of information including notifications originating from a plurality of applications operating on the computing device;
   a first displayed item of information from the plurality of items of information corresponding with a most recent notification received from the plurality of applications, the first displayed item of information to be removed from the plurality of items of information after a predetermined amount of time.

2. The computing device of claim 1, the application comprising an information management application running on the processor.

3. The computing device of claim 2, wherein the at least one of the items of information provides an indication of at least one of a voicemail, an email, and a calendar appointment.

4. The computing device of claim 1, the display is a touch screen display.

5. The computing device of claim 4, the processor to receive a selection of one of the items of information via the display and provide additional content in response to receiving the selection.

6. The computing device of claim 5, the additional content is one of email data, voicemail data, and data retrieved via a wireless network.

7. The computing device of claim 1, the computing device is a handheld computing device.

8. A computing device, comprising:
   a display; and
   a processor coupled with the display and to display a plurality of message items, each message item associated with content including notifications originating from a plurality of applications operating on the computing device, the message items being automatically displayed in a scrolling fashion at a default rate on the display in an order determined by when each message item was received from the plurality of applications and without user interaction; the processor to determine whether to display each of the message items based on when each message item was received from the plurality of applications, the processor to adjust at least one of a time interval between message items being displayed and a direction in which the message items are scrolled across the display.

9. The computing device of claim 8, the content associated with each message item originates from at least one content source.

10. The computing device of claim 9, the at least one content source is an email application and the processor determines whether to display the message item representing the content associated with the email application based on whether the email application has any new or unread email messages.

11. The computing device of claim 9, the at least one content source is a calendar application and the processor determines whether to display the message item representing the content associated with the calendar application based on a calendar entry in the calendar application.

12. The computing device of claim 11, the calendar entry represents an appointment for a user.

13. The computing device of claim 8, the processor to determine whether to provide each of the message items further based on the relevancy of the content to the user.

14. The computing device of claim 8, further comprising:
    a memory;

wherein for each message item, the processor to store data required to display the message item in the memory prior to displaying the image.

15. A method of presenting content on an electronic device, comprising:
    automatically displaying a plurality of images on a display such that the plurality of images automatically scroll across the display at a default rate and without user interaction, the images being displayed with a predetermined time interval between images and in a predetermined order; the plurality of images including notifications originating from a plurality of applications operating on the electronic device; a first displayed image from the plurality of images corresponding with a most recent notification received from the plurality of applications;
    removing the first displayed image from the plurality of images after a predetermined amount of time;
    receiving an input from a user; and
    adjusting at least one of the time interval and the predetermined order based on the input.

16. The method of claim 15, the display is a touch screen display and the input is received by the display.

17. The method of claim 16, the input is a gesture received from the user comprising a direction and a speed.

18. The method of claim 17, wherein the time interval between images is based upon the speed of the gesture.

19. The method of claim 17, wherein the predetermined order is determined by the direction of the gesture.

20. The method of claim 15, wherein at least one of the images provides an indication of at least one of a voicemail, an email, and a calendar appointment.

21. The method of claim 15, the processor to temporarily adjust the time interval and the predetermined order in response to the input.

22. The method of claim 15, the plurality of images are substantially the same size and occupy substantially the same display area.

23. The method of claim 15, comprising:
    storing data required to display the plurality of images in a memory prior to displaying the plurality of images.

* * * * *